United States Patent [19]

Hara et al.

[11] 4,407,899
[45] Oct. 4, 1983

[54] SURFACE TREATED STEEL SHEETS FOR PAINT COATING

[75] Inventors: Tomihiro Hara; Masahiro Ogawa; Masaaki Yamashita; Yasuhisa Tajiri, all of Yokohama, Japan

[73] Assignee: Nippon Kokan Kabushiki Kaisha, Tokyo, Japan

[21] Appl. No.: 331,664

[22] Filed: Dec. 17, 1981

[30] Foreign Application Priority Data

Dec. 24, 1980 [JP] Japan .................. 55-182111

[51] Int. Cl.³ .................. C25D 3/04; C25D 11/38
[52] U.S. Cl. .................. 428/626; 428/623; 428/632; 428/629; 428/658; 428/659; 428/928; 204/28
[58] Field of Search .......... 428/626, 623, 632, 629, 428/658, 659; 204/28

[56] References Cited

U.S. PATENT DOCUMENTS 4,249,999 2/1981 Tsuda et al. .................. 204/28
4,298,661 11/1981 Ikeno et al. .................. 428/632

FOREIGN PATENT DOCUMENTS 54-77635 of 1979 Japan .
55-62972 of 1980 Japan .
1562651 3/1980 United Kingdom .

Primary Examiner—Veronica O'Keefe
Attorney, Agent, or Firm—Frishauf, Holtz, Goodman & Woodward

[57] ABSTRACT

A steel sheet with its surface prepared for paint coating is disclosed. The surface treated steel sheet comprises a base sheet, and an iron-zinc alloy film plated on the base sheet in an amount of at least 0.1 g/m² and having an iron content of from 3 to 30%. A composite silicate resin film is coated on the iron-zinc alloy film in an amount of from 0.05 to 5.0 g/m². The resin film is composed of an acrylic copolymer, an epoxy resin, a silica sol and a trialkoxysilane compound. The treated surface provides superior paintability, degrease resistance and corrosion resistance after pain coating.

12 Claims, 1 Drawing Figure

Ⓐ Paintability

Ⓑ Corrosion resistance after paint coating

Ⓒ Degrease resistance

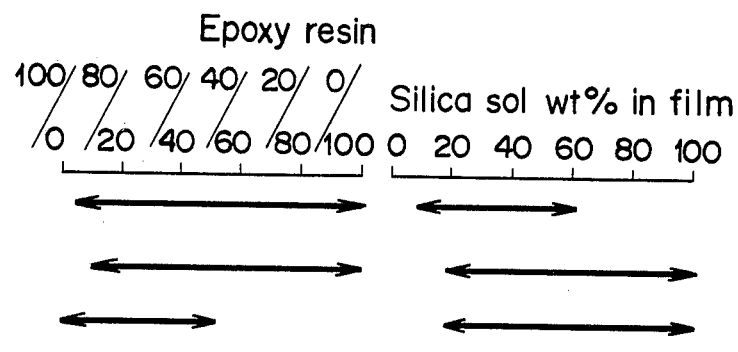
Ⓐ Paintability
Ⓑ Corrosion resistance after paint coating
Ⓒ Degrease resistance

SURFACE TREATED STEEL SHEETS FOR PAINT COATING

BACKGROUND OF THE INVENTION

1. Field of the Invention

The present invention relates to a steel sheet having its surface prepared for paint coating

2. Description of the Prior Art

Such a steel sheet is useful as construction material or material for household electrical appliances. Galvanized steel sheets with their surface treated by phosphate treatment or chromate treatment, have been commonly used.

Chromate treated steel sheets have good corrosion resistance with passivation provided by chromium. However, the chromate treatment gives rise to problems due to the toxicity of chromium, particularly in the waste water treatment. On the other hand, the phosphate treatment provides a good substrate surface for painting. However, in order to impart corrosion resistance as well, it is common to subject the phosphate treated steel sheets to pickling with chromic acid as after-treatment. This after-treatment gives rise to the same problems as in the case of the chromate treatment. Further, a large amount of sludge produced by the treatment creates another problem for its disposal. Further, such conventional products do not necessarily have a satisfactory quality in their properties required for a substrate for painting, such as corrosion resistance after paint coating, paintability and degrease resistance. Especially, they tend to undergo property degradation when subjected to alkaline degreasing treatment at the user's end, i.e., they are inferior in the degreasing resistance.

There have been some proposals for improvement in an attempt to solve the above mentioned problems. Japanese Patent Publication No. 34406/74 discloses a method in which a silicate composite material comprising silica and an acrylic copolymer as the major components is used and certain improvements over this method are disclosed in Japanese Laid-Open Applications No. 77635/79 and No. 62972/80.

From the results of experiments conducted by the present inventors in which the composite materials proposed in the above mentioned prior art are applied to galvanized steel sheets, it has been found that the coatings thereby obtained do not fully satisfy the requirements for corrosion resistance after paint coating, paintability and degrease resistance, which are essential for steel sheet substrates for painting, and that there is still room for improvement.

SUMMARY OF THE INVENTION

Accordingly, it is an object of the present invention to provide steel sheets having superior properties required for a substrate for paint coating, such as a rust prevention property, paintability, degrease resistance and corrosion resistance after paint coating, without employment of chromium.

Thus, the present invention provides a steel sheet having its surface prepared for paint coating, which comprises a base steel sheet, an iron-zinc alloy film plated on the surface of the base sheet in an amount of at least 0.1 g/m$^2$ and having an iron content of from 3 to 30% by weight, and a composite silicate resin film coated on the iron-zinc alloy film in an amount of from 0.05 to 5.0 g/m$^2$ and comprising an acrylic copolymer, an epoxy resin, a silica sol and a trialkoxysilane compound.

BRIEF DESCRIPTION OF THE DRAWING

The sole FIGURE of the drawing shows a graph illustrating the relationship between the ratio of the acrylic copolymer to the epoxy resin or the amount of the silica sol and the paintability, corrosion resistance after paint coating and degrease resistance.

DETAILED DESCRIPTION OF THE INVENTION

IRON-ZINC ALLOY PLATED FILM

Commonly used zinc plating does not provide an adequate quality for a primary coating film on a steel sheet. Particularly, a galvanized surface is inferior in corrosion resistance after paint coating and degrease resistance. It has been found that an iron-zinc alloy film plated on a steel sheet and containing from 3 to 30% by weight of iron providing superior effectiveness for all of the required properties. The iron-zinc alloy film may be formed by:

(1) a method in which a zinc plated film formed by a common electroplating or hot dipping process is subjected to heat treatment at a temperature of several hundreds degree (°C.), thereby to form an iron-zinc alloy plated film; or (2) a method in which an iron-zinc alloy film is precipitated from a plating bath comprising iron and zinc, by an electolytic process.

Regardless of the method of plating employed, effectiveness is obtainable so long as an iron-zinc alloy film containing from 3 to 30% by weight of iron is formed as the primary coating. There are certain variations in effectiveness observed, depending on the method employed. What is attributable to such variations in effectiveness is not clearly understood although it is conceivable that differences in the proportions of the alloy components and influences of oxide layers on the surface may be the factors for such variations.

This iron-zinc alloy coating provides such effectiveness not only when formed directly on a steel sheet, but also when formed on a plated surface of a steel sheet, i.e., a surface plated with an element such as zinc, nickel, aluminium, lead, copper, chromium, cobalt or tin, or with an alloy composed of two or more such elements.

The iron content in the plated film is from 3 to 30% by weight, preferably from 5 to 20% by weight. If the iron content is less than 3% by weight, no adequate effectiveness is obtainable and the corrosion resistance after paint coating and degrease resistance become poor as in the case of galvanized steel sheets. On the other hand, if the iron content exceeds 30% by weight, the plated surface tends to have properties close to those of a bare steel sheet and becomes susceptible to corrosion, and thus it cannot provide a sufficient anti-corrosion property required for a substrate for painting.

COMPOSITE SILICATE RESIN FILM

The composite silicate resin film as the second layer coating, can be formed by applying, onto the iron-zinc alloy plated film, an aqueous treating solution which comprises a combination of two different types of composite materials, i.e., acryl/silicate composite material composed of an acrylic resin and silica sol and epoxy/silicate composite material composed of an epoxy resin and silica sol, followed by drying. With such a film of composite materials, it is possible to obtain a steel sheet having totally superior characteristics as a substrate for painting. Namely, the epoxy/silicate composite material serves mainly to improve the paintability and corrosion resistance. Whereas, the acryl/silicate composite material serves mainly to improve the degrease resistance. Further, as the proportion of the silica sol increases, the corrosion resistance and degrease resistance tend to be improved.

However, the most important thing is that the composite silicate resin film provides such excellent effectiveness only when applied on the iron-zinc alloy plated film containing 3 to 30% by weight of iron.

The composite silicate resin used in the present invention can be prepared by the method disclosed in Japanese Patent Publication No. 34406/79. Namely, water dispersible silica which is called silica sol or colloidal silica, and water soluble or water dispersible acrylic copolymer and epoxy resin are used as the main components. To the main components, a trialkoxy silane compound is added as a reaction promoting agent, and the mixture thereby obtained is reacted at a temperature of from 10° C. to the boiling temperature, whereby a composite silicate resin material useful for the present invention is obtainable. In order to obtain a composite silicate resin especially suitable to a practical application, the reaction should better be carried out at a temperature of from 50° to 90° C. Further, the trialkoxy silane compound is added usually in an amount of from 0.5 to 13% by weight, based on the total weight of the solid content of the resins and the silica sol.

For this reaction, each of the acrylic copolymer and the epoxy resin may be independently reacted with silica sol and trialkoxy silane, and the acrly/silicate composite material and the epoxy/silicate composite material thereby obtained are then mixed to produce a desired composite silicate resin composition. Otherwise, the four components, i.e., the acrylic copolymer, epoxy resin, silica sol and trialkoxy silane compound may be altogether be reacted at once to obtain a composite silane resin composition which has adequate effectiveness.

The acrylic copolymer which may be used in the present invention includes a water-soluble or water dispersible copolymer prepared from an unsaturated ethylenic monomer by solution polymerization, emulsion polymerization or suspension polymerization, an alkyd-modified acrylic resin, an epoxy-modified acrylic resin, a polybutadiene-modified acrylic resin, a polyurethane-modified acrylic resin, a phenyl-modified acrylic resin or an amino resin-modified acrylic resin. Whereas, as the epoxy resin, there may be used a fatty acid-modified epoxy resin, a polybasic acid-modified epoxy resin, an acrylic resin-modified epoxy resin, an alkyd resin-modified epoxy resin, a phenol resin-modified epoxy resin, a polybutadiene-modified epoxy resin and an amine-modified epoxy resin. In order to dissolve or disperse the above mentioned resin in water, an amine or ammonia may be added.

The trialkyl silane compound used as the reaction promoting agent in the reaction for preparing the composite composition, may be commercially available silane coupling agent such as vinyltriethoxy silane, vinyltris ($\beta$-methoxyethoxy) silane, $\gamma$-glucideoxypropyltrimethoxy silane, $\gamma$-methacryloxypropyltrimethoxy silane, N-$\beta$(aminoethyl)-$\gamma$-aminopropyltrimethoxy silane and $\gamma$-aminopropyltriethoxy silane.

As the water dispersible silica which is called silica sol or colloidal silica, a commercial product may be used as it is. However, depending upon the stability range of the particular resins used, selection should be made for proper use form acidic and basic products.

Now, the optimal ranges of the composite silicate resin-forming components, i.e., the silica sol, acrylic copolymer, and epoxy resin will be described.

The basic properties required for a substrate for painting are the paintability, corrosion resistance after paint coating and degrease resistance. To determine the optimal ranges of the components to satisfy these basic property requirements, an experiment has been made by varying the proportion of the silica sol in the epoxy/silicate composite material and in the acryl/silicate composite material from 0 to 90% by weight (i.e., a ratio of the solid content), and by varying the ratio of the acryl/silicate composite material to the epoxy/silicate composite material in the treatment solution from 100/0 to 0/100. The results thereby obtained are shown in the sole FIGURE of the drawing in which the symbol ⟵⟶ indicates a range within which relatively good properties were obtained.

It is seen from this FIGURE that in order to fully satisfy the property requirements, the amount of the silica sol should be within a range of from 20 to 60% by weight of the total solid components of the resins and the silica sol, and the ratio of acrylic copolymer to epoxy resin (i.e., acrylic copolymer/epoxy resin) is within a range of from 90/10 to 50/50. However, in order to obtain such superior effectiveness of the composite silicate resin film as a substrate for painting, it is essential that there is an under coat of the iron-zinc alloy film which contains from 3 to 30% by weight of iron.

As the method for forming the second layer of the composite silicate resin film, there may be used a commonly-employed method such as dipping, spraying or roll coating, and after the application of a predetermined amount of the treatment solution, it is dried by blowing hot air at a temperature of normal temperature to 100° C. (or even higher), whereby a dried film is obtainable within a period of a few seconds to a few minutes.

COATING AMOUNTS OF THE FIRST AND SECOND LAYERS

The coating amount of the primary layer of the iron-zinc alloy film is at least 0.1 g/m$^2$ (per one side), preferably at least 10 g/m$^2$. If the amount is less than this lower limit, desired effectiveness of the second layer is not obtainable. The coating amount of the second layer of the composite silicate resin film is from 0.05 to 5.0 g/m$^2$ (per one side), preferably from 0.2 to 3.0 g/m$^2$. No adequate effectiveness is obtainable if the amount is less than 0.05 g/m$^2$. If the amount exceeds 5 g/m$^2$ no remarkable improvement of the properties is expected although there is a certain improvement observed. Accordingly, such an excess amount is economically disadvantageous. Further, the continuous spot weldability of the treated steel sheet tends to be poor when such an excess amount is used, and thus the practical utility as a surface treated steel sheet becomes poor.

EFFECTIVENESS

The mechanism behind the superior effectiveness is not clearly understood. However, it is seen that the composite film composed basically of the silica sol, epoxy resin and acrylic copolymer, is extremely fine, and firmly bonded to the primary layer of the iron-zinc alloy film.

Further, each component appears to provide its own function adequately within the optimal ranges shown in the FIGURE of the drawing. As mentioned above, adequate effectiveness is obtainable only when the iron-zinc alloy film containing from 3 to 30% of iron is used as the primay coating, and no such effectiveness is obtainable when iron or zinc plating is used for the primary coating. This is attributable to the fact that the interfacial bond between the composite silicate resin film and the iron-zinc film is strong, and during the curing process of the composite silicate resin film, the iron-zinc alloy components appear to provide certain curing effectiveness to form a strong film, whereby such superior effectiveness is obtainable.

ADDITION OF OXY ACIDS OF VANADIUM and/or THEIR SALTS

Now, the alkoxide compounds, and oxy acids of vanadium and their salts which may be added to the composite silicate resin treatment solution, will be described.

To improve the desired properties, it is effective to add an alkoxide compound of titanium or zirconium, or an oxy acid of vanadium and/or a salt thereof. It is possible to further improve the corrosion resistance after paint coating and the degrease resistance by adding one or more such additives in an amount of not more than 14% by weight, preferably from 0.2 to 8% by weight, based on the total weight of the solid content of the silica sol and the resins.

The alkoxide compound of titanium or zirconium is a coodination compound having at least two functional groups (preferably 2 or 3 functional groups) in which an alkoxide compound represented by the general formula $R'_2M(R^2)_2$, $R'M(R^2)_3$ or $M(R^2)_4$ is bonded to a ligand of a dicarboxylic acid such as maleic acid; a hydroxycarboxylic acid such as lactic acid or tartaric acid; a diketone such as ethylene glycol, diaceton alcohol or acetyl acetone; an ester such as ethyl acetoacetate or ethyl malonate; a ketone ester; salicylic acid; catechol; pyrogallol; an alkanol amine such as triethanol amine, diethanol amine or dimethylaminoethanol. In the above general formular, M is titanium or zirconium, R' is a substituent such as an ethyl group, an amyl group, a phenyl group a vinyl group, a p-(3, 4-epoxycyclohexyl group), γ-mercaptopropyl group, or an aminoalkyl group, $R^2$ is usually an alkoxy group having from 1 to 8 (for instance, a methoxy group, an ethoxy group, a n-propoxy group, an isopropoxy group, a n-butoxy group, an isobutoxy group, a sec.-butoxy group, a tert.-butoxy group, a n-pentoxy group, an isopentoxy group, a n-hexoxy group, a n-heptoxy group or a n-octoxy group) or an alkoxyalkoxy group having a total of from 2 to 10 carbon atoms (for instance, a methoxymethoxy group, a methoxyethoxy group, an ethoxybutoxy group or a butoxypentoxy group).

As the oxy acids of vanadium and their salts, there may be mentioned, for instance, vanadium trioxide ($V_2O_3$), vanadium pentoxide ($V_2O_5$), sodium orthovanadate ($Na_3VO_4$), lithium orthovanadate ($Li_2VO_4$), lithium metavanadate ($LiVO_3$ $2H_2O$), potassium metavanadate ($KVO_3$), sodium metavanadate ($NaVO_3$ $4H_2O$), ammonium metavanadate ($NH_4VO_3$), and sodium pyrovanadate ($Na_4V_2O_7$).

The amount of these additives to be incorporated is in the range mentioned above. If the additives are added excessively, the effectiveness of the composite silicate resin film thereby obtained tends to be decreased leading to degradation of the desired properties. Such an excess amount is undesirable for an additional reason that the cross-linking reaction is thereby facilitated too much leading to thickening of the treatment solution.

The effectiveness of the additives is attributable to the fact that the additives act as a cross-linking agent, thereby reducing the residual hydrophilic groups in the silicate resin film and increasing the density of the cross-linkages in the film, whereby the corrosion resistance after paint coating and the degrease resistance are improved.

OTHER ADDITIVES

In the present invention, it is also possible to further incorporate other additives which are commonly used in the art to impart desired properties, such as water soluble or water dispersible organic resins or rust preventive pigments, rust preventive agents such as an inhibitor, cations such as molybdenum and tungsten or their compounds.

EXAMPLES

Now, the present invention will be described in detail with reference to Examples.

Referring to Table 1 below, steel sheets Nos. 1 to 7 of the present invention were tested for the primary corrosion resistance, secondary corrosion resistance, primary adhesion (i.e., paintability) and degrease resistance. The results thereby obtained are shown in Table 2 in comparison with comparative steel sheets.

It is seen from the test results of Table 2 that the steel sheets of the present invention are superior to those treated by the conventional phosphate treatment or chromate treatment, and their properties are extremely well balanced.

The method of treatment employed to obtain the steel sheets of the present invention and the comparative steel sheets was as follows:

METHOD OF TREATMENT (A) Preparation of Acryl/Silicate Composite Material

In a 1 liter four necked flask equipped with a thermometer, a stirrer, a condenser and a dropping funnel, 180 g of isopropyl alcohol was introduced, and after purging with nitrogen, the temperature in the flask was adjusted to about 85° C. and monomer mixture comprising 140 parts of ethylacrylate, 68 parts of methylmethacrylate, 15 parts of styrene, 15 parts of N-n-butoxymethylacrylamide, 38 parts of 2-hydroxyethylacrylate and 24 parts of acrylic acid, is dropwise added together with 6 parts of 2, 2'-azobis (2, 4-dimethyl valero nitrile) in about 2 hours. After completion of the dropwise addition, the reaction was continued at the same temperature for further 5 hours, whereupon a colourless transparent resin solution having a solid content of 63% and an acid value of 67 was obtained. Mixed with 500 parts of this acrylic copolymer resin solution was 45 parts of a 38% aqueous ammonia, and after an addition of water, the mixture was throughly stirred, whereupon an aqueous dispersion of acrylic copolymer having a solid content of 20% and a pH of 9.5 was obtained. Three hundred parts of this aqueous dispersion was fed into a flask, and a predetermined amount of colloidal silica (Trade Mark "Snowtex N" maufactured by Nisshin Chemical Industries, Ltd.) was added while sufficiently stirring the dispersion at room temperature. Then, 1 part of γ-methacryloxpropyltrimethoxy silane (Trade Name "KBM 503" manufactured by Shinetsu Chemical Co., Ltd.) was dropwise added under stirring, and the mixture was then heated to 85° C. and reacted at the same temperature for 2 hours, whereupon a milky water dispersible acryl/silicate composite material was obtained.

(B) Preparation of Epoxy/Silicate Composite Material

Into a flask, 310 parts of an epoxy resin of bisphenol A type having an epoxy equivalent of 950 (Trade Name "Epicoat 1004" manufactured by Shell Chemical Co., Ltd.), 95 parts of linseed oil fatty acids, 95 parts of tung oil fatty acids and 15 parts of xylene were introduced, and gradually heated up to 240° C. while supplying nitrogen. Then, the mixture was cooled and when the mixture was cooled down to 70° C., 200 parts of ethylene glycol monoethyl ether was added, whereupon an oil-modified epoxy resin solution having a solid content of 70% and an acid value of 54 was obtained.

In a manner similar to the above method (A), an epoxy/silicate composite material was obtained from this oil-modified epoxy resin solution.

Following the above methods (A) and (B), samples of the acryl/silicate composite material and the epoxy/silicate composite material were prepared to have the content of silica sol varied from 0 to 90% by weight (ratios by solid content). Then, composite silicate resin treatment solutions were prepared to have the ratio of the acryl/silicate composite material to the epoxy/silicate composite material varied from 100/0 to 0/100. With use of these treatment solution, test steel samples were prepared in the following procedure.

Cold rolled steel sheets of 0.7 m/m thick plated thereon with iron-zinc alloy coating of different iron content applied by different methods of electrolysis and heat treatment, and, as comparative steel sheets, galvanized steel sheets and cold rolled steel sheets, were used. After cleaning their surfaces the above mentioned composite silicate resin treatment solution were applied thereto by groove rolls, and then dried by hot air of 70° C. for 20 to 30 seconds, whereupon test samples were obtained.

As the comparative steel sheets, there were used electrogalvanized steel sheets treated by phosphating or chromating hotdip plated iron-zinc alloy steel sheets treated by chromating, and steel sheets plated only with an iron-zinc film, as well as those similar to but outside the scope of the present invention.

TABLE 1

(Outside of the invention is shown with "—")

| No. | A | | | B | | |
|---|---|---|---|---|---|---|
| | C | D | E | F | G | H |
| 1 | 12 | 45 | α | 60/40 | 40 | 2.0 |
| 2 | " | " | " | 70/30 | " | " |
| 3 | " | " | " | 80/20 | " | " |
| 4 | " | " | " | 70/30 | " | 0.5 |
| 5 | 14 | 40 | β | " | " | 2.0 |
| 6 | 14 | 20 | " | " | " | " |
| 7 | " | 10 | " | " | " | " |
| 8 | 12 | 45 | α | " | 0 | " |
| 9 | " | " | " | " | 90 | " |
| 10 | " | " | " | 0/100 | 40 | " |
| 11 | " | " | " | 100/0 | " | " |
| 12 | " | " | " | 70/30 | " | 0.03 |
| 13 | " | " | " | " | " | 6.0 |
| 14 | 0 | 40 | β | " | " | 2.0 |
| 15 | 2 | " | " | " | " | " |
| 16 | 40 | " | " | " | " | " |

TABLE 1-continued (Outside of the invention is shown with "—")

| No. | A | | | B | | |
|---|---|---|---|---|---|---|
| | C | D | E | F | G | H |
| 17 | 40 | 45 | α | " | " | " |
| 18 | 70 | 40 | β | " | " | " |
| 19 | Cold Steel Steel Sheets | | | 70/30 | 40 | 2.0 |
| 20 | 14 | 0.05 | β | " | " | " |
| 21 | 0 | 40 | " | I | | |
| 22 | 0 | 40 | " | J | | |
| 23 | 14 | 45 | α | K | | |
| 24 | 14 | 45 | " | L | | |

No. 1 to No. 7: Inventive steels
No. 8 to No. 24: Comparative steels
A: Zinc and iron - Zinc alloy plated film
B: Compound organic silicate film
C: Iron content (wt %)
D: Plating amount (one side g/m$^2$)
E: Manufacturing process Refer to NOTE 1
F: Acryl/epoxy solid content ratios
G: Silica sol content in film (wt %)
H: Film sticking amount (g/m$^2$) Refer to NOTE 2
I: Zinc phosphate treatment + chromate sealing (Cr deposition 1 mg/m$^2$)
J: Chromate treatment (Cr deposition 15 mg/m$^2$)
K: Chromate treatment (Cr deposition 35 mg/m$^2$)
L: Non treated

NOTE 1:

Method α for forming zinc and iron-zinc alloy plated films comprises forming a zinc plated layer by usual hot-dip zinc plating and subjecting it to heat treatment to diffuse iron into the zinc plated layer, whereby an iron-zinc alloy is formed throughout the layer up to the top of its surface.

Method β comprises conducting electrolysis in a plating bath composed of an aqueous solution containing iron ions and zinc ions (or zinc ions only), whereby iron and zinc are electrolytically deposited on the surface of a steel sheet to form an iron-zinc alloy film.

NOTE 2:

The coating amounts of the films were obtained by measuring the Si amounts by FX and calculating from the proportions of the solid content thereof.

TABLE 2

| | A | | | | | | |
|---|---|---|---|---|---|---|---|
| | C | | F | H | | | |
| B | D | E | G | I | J | K | |
| 1 | 5 | 3 | 0.5 m/m | 5 | 5 | ○ | |
| 2 | 5 | 3 | 0.7 | 5 | 4 | ◉ | |
| 3 | 5 | 3 | 1.0 | 5 | 3 | ◉ | |
| 4 | 4 | 2 | 1.4 | 5 | 4 | ○ | |
| 5 | 5 | 3 | 0.8 | 5 | 4 | ◉ | |
| 6 | 4 | 3 | 0.9 | 5 | 4 | ◉ | |
| 7 | 4 | 3 | 0.9 | 5 | 4 | ◉ | |
| 8 | 3 | 1 | 5.2 | 5 | 4 | x | Spot weldings are impossible |
| 9 | 3 | 1 | 2.4 | 3 | 1 | ○ | |
| 10 | 4 | 1 | 1.8 | 5 | 5 | x | |
| 11 | 4 | 1 | 4.6 | 4 | 1 | ◉ | |
| 12 | 4 | 1 | 2.7 | 5 | 3 | x | |
| 13 | 5 | 3 | 0.6 | 5 | 4 | ◉ | |
| 14 | 4 | 2 | 3.2 | 5 | 1 | x | |
| 15 | 4 | 2 | 3.0 | 5 | 3 | △ | |
| 16 | 2 | 1 | 5.8 | 5 | 2 | x | |
| 17 | 2 | 1 | 5.2 | 5 | 2 | x | |
| 18 | 1 | 1 | 7.0 | 5 | 2 | x | |
| 19 | 1 | 1 | 9.0 | 5 | 2 | x | |
| 20 | 4 | 2 | 4.0 | 5 | 2 | x | |
| 21 | 4 | 1 | 1.5 | 5 | 3 | △ | |
| 22 | 4 | 1 | 1.9 | 5 | 2 | △ | |
| 23 | 4 | 2 | 1.2 | 5 | 2 | △ | |

TABLE 2-continued

| B | C | | F | | H | | | |
|---|---|---|---|---|---|---|---|---|
|   | D | E | G | | | I | J | K |
| 24 | 2 | 1 | 5.0 | | | 4 | 1 | — |

No. 1 to No. 7: Inventive steels
No. 8 to No. 24: Comparative steels
A: Testing items
B: Test steels
C: Primary corrosion resistance Refer to NOTE 1
D: 24 hours
E: 120 hours
F: Secondary corrosion resistance Refer to NOTE 2
G: Average peeling length on one side
H: Primary adhesion Refer to NOTE 3
I: Lattice cut test
J: Lattice cut Erichsen test
K: Degrease resistance Refer to NOTE 4
NOTE 1:
Primary corrosion resistance
Surface treated steel sheets before paint coating were subjected to a salt spray test for 24 hours and 120 hours according to JIS-Z-2371, and then the surface areas of white rust were determined on the basis of the following standards:

| Evaluation points | Surface areas of white rust |
|---|---|
| 5 | None |
| 4 | 1 to 10% |
| 3 | 11 to 25% |
| 2 | 26 to 50% |
| 1 | More than 50% or formation of red rust |

NOTE 2:
Secondary corrosion resistance (corrosion resistance after paint coating)
After applying a melamine-alkyd resin paint (baking at 140° C. for 20 minutes; film thickness of 30μ, pencil hardness: H to 2H), the paint film formed on the steel sheet was crosscut, and the steel sheet coated with the crosscut paint film was subjected to a salt spray test of JIS-Z-2371 for 120 hours and then left in a room for 12 hours. A scotch tape was adhered to the crosscut portion of the paint film, and then the crosscut portion was instantaneously peeled off. The average peeled length (m/m) along one side was calculated by the following equation:

$$\text{Average peeled length (m/m) along one side peel} = \frac{\text{Average peeled length (m/m) of the crosscut portion}}{2}$$

NOTE 3:
Primary adhesion (Paintability)
After applying the above mentioned paint, the painted steel sheets were subjected to a lattice cut test and a lattice cut Erichsen test to see the damages of the paint films.
Lattice cut test
The paint film was scored with 11 parallel cut lines with a distance of 1 m/m from one another in each vertical and transverse directions to form one hundred squares. A scotch tape was adhered thereon, and the paint film was peeled off instantaneously.
Lattice cut Erichsen test
In a matter similar to the above, the paint film was scored with cut lines to form squares, and the steel sheet was pressed by 5 m/m by an Erichsen press machine. Then, a scotch tape was adhered to the paint film was instantaneously peeled off. The evaluation standards for the lattice cut test and the lattice cut Erichsen test were as follows:

| Evaluation points | Damages of the paint film surface |
|---|---|
| 5 | No damages |
| 4 | Paint coating slightly peeled off |
| 3 | Moderately peeled off |
| 2 | Considerably peeled off |
| 1 | Most peeled off |

NOTE 4:
Degrease resistance
Non-painted surface treated steel sheets were subjected to alkaline degreasing for pre-treatment before paint coating (e.g. Lidorine 75N-1 manufactured by Nippon Paint K.K., 29 g/l, 60° C., 1 atomspheric pressure, spraying for 2 minutes), then washed and dried, and subjected to the secondary corrosion resistance test and the primary adhesion test to determine the degree of the property degradation.

Evaluation standards
◉ No change observed in the properties
○ Slight degradation observed
△ Moderate degradation observed
× Substantial degradation observed Now Examples will be given to show the effectiveness of alkoxide compound, and oxy acids of vanadium and their salts which may be added to the composite silicate resin treatment solution.

On steel sheets coated with an iron-zinc alloy film (the amount of the coating: 45 g/m²) containing 14% by weight of iron, which were prepared by Method α mentioned in Table 1, about 2 g/m² of composite silicate resin film was formed in the same manner as in the case shown in Table 1. The composite silicate resin treatment solution employed, had a solid content ratio of the acrylic copolymer/the epoxy resin of 70/30 and a silicate sol content of 40% by weight based on the total solid content, and further it contained an alkoxy compound and oxy acid salt of vanadium. Then, the steel sheets were subjected to the test.

As shown in Table 3 below, the above additives exhibit superior effectiveness for the primary corrosion resistance and the secondary corrosion resistance.

TABLE 3

| | A | | | D | | G | I | | |
|---|---|---|---|---|---|---|---|---|---|
| No. | B | C | E | F | | H | J | K | L |
| 25 | M | 1 | 5 | 4 | | 0.6 m/m | 5 | 4 | ◉ |
| 26 | M | 5 | 5 | 5 | | 0.5 | 5 | 4 | " |
| 27 | N | 1 | 5 | 4 | | 0.5 | 5 | 4 | " |
| 28 | N | 5 | 5 | 4 | | 0.6 | 5 | 4 | " |
| 29 | O | 1 | 5 | 4 | | 0.4 | 5 | 4 | " |
| 30 | O | 5 | 5 | 5 | | 0.4 | 5 | 4 | " |
| 31 | P | | 5 | 3 | | 0.7 | 5 | 4 | " |

A: Additives in the composite silicate resing film
B: Kinds
C: Addition amount Refer to NOTE 1
D: Primary corrosion resistance
E: 24 hours
F: 120 hours
G: Secondary corrosion resistance
H: Average peeled length on one side
I: Primary adhesion
J: Lattice cut test
K: Lattice cut Erichsen test
L: Degrease resistance
M: Dibutyl titanate Refer to NOTE 2 (No. 25)
N: Sodium orthovanadate
O: Ammonium metavanadate
P: Comparative Example (No additives)
NOTE 1:
The amounts per 100 g of the solid content of the silica gel and the resin, provided that the crystal water was omitted
NOTE 2:
This material was prepared by mixing butyl titanate (Trade Name: Tetra-n-butyl titanate TBT-100 manufactured by Nippon Soda Co., Ltd.) with triethanol amine and keeping the mixture at 50° C. for 24 hours while shielding off the moisture in the air.

What is claimed is:

1. A steel sheet having its surface prepared for paint coating consisting essentially of a base steel sheet "with an iron content of from 5 to 20% by weight", an iron-zinc film plated on the surface of said base sheet in an amount of at least 0.1 g/m² with an iron content of from 3 to 30% by weight, and a composite silicate resin film coated on said iron-zinc alloy film in an amount of 0.05 to 5.0 g/m² and consisting essentially of an acrylic copolymer, an epoxy resin, a silica sol and a trialkoxysilane compound.

2. A steel sheet as claimed in claim 1, in which said iron-zinc alloy film is plated in an amount of at least 10 g/m².

3. A steel sheet as claimed in claim 1, in which said composite silicate resin film is coated in an amount of from 0.2 to 3.0 g/m².

4. A steel sheet as claimed in any one of claims 1, 2, or 3, in which said composite silicate resin film is formed by application of a composite silicate resin treatment solution consisting essentially of the following solid content composition

| (a) acrylic copolymer/epoxy resin in a water ratio of from 90/10 to 50/50 | 40 to 80% by weight of the total solid content of components (a) and (b) |
|---|---|
| (b) silica sol | 20 to 60% by weight of the total solid content of components (a) and (b) |
| (c) trialkoxysilane compound | 0.5 to 13% by weight of the total solid content of components |

5. A steel sheet as claimed in claim 4, in which said composite silicate resin treatment solution further contains at least one component selected from the group consisting of alkoxide compounds of titanium or zirconium, and oxy acids of vanadium and their salts, in an amount of not more than 14% by weight of the total solid content of components (a) and (b).

6. A steel sheet as claimed in claim 5, in which said at least one component is incorporated in an amount of from 0.2 to 8% by weight of the total solid content.

7. A steel sheet as claimed in any one of claims 1, 2, 3 or 4, in which said epoxy resin is selected from the group consisting of a fatty acid-modified epoxy resin, a polybasic acid-modified epoxy resin, an acrylic resin-modified epoxy resin, an alkyd resin-modified epoxy resin, a phenol resin-modified epoxy resin, a polybutadiene resin-modified epoxy resin, and an amine-modified epoxy resin.

8. A steel sheet as claimed in any one of claims 1, 2, 3 or 4, in which said acrylic copolymer is selected from the group consisting of a water soluble or water dispersible copolymer prepared by solution polymerization, emulsion polymerization or suspension polymerization with use of an unsaturated ethylenic monomer, an alkyd-modified acrylic resin, an epoxy-modified acrylic resin, a polybutadiene-modified acrylic resin, a polyurethane-modified acrylic resin, a phenyl-modified acrylic resin, and an amino resin-modified acrylic resin.

9. A steel sheet as claimed in any one of claims 1, 2, 3 or 4, in which said trialkoxysilane compound is selected from the group consisting of vinyltriethoxy silane, vinyltris (γ-methoxyethoxy) silane, γ-glucideoxypropyltrimethoxy silane, γ-methacryloxypropyltrimethoxy silane, N-β(aminoethyl)-γ-aminopropyltrimethoxy silane and γ-aminopropyltriethoxy silane.

10. A steel sheet as claimed in any one of claims 1, 2, 3 or 4 in which said epoxy resin is selected from the group consisting of a fatty acid-modified epoxy resin, a polybasic acid-modified epoxy resin, an acrylic resin-modified epoxy resin, an alkyd resin-modified epoxy resin, a phenol resin-modified epoxy resin, a polybutadiene resin-modified epoxy resin, and an amine-modified epoxy resin;

said acrylic copolymer is selected from the group consisting of a water soluble or water dispersible copolymer prepared by solution polymerization, emulsion polymerization or suspension polymerization with use of an unsaturated ethylenic monomer, an alkyd-modified acrylic resin, an epoxy-modified acrylic resin, a polybutadiene-modified acrylic resin, a polyurethane-modified acrylic resin, a phenyl-modified acrylic resin, and an amino resin-modified acrylic resin; and said trialkoxysilane compound is selected from the group consisting of vinyltriethoxy silane, vinyltris (β-methoxyethoxy) silane, γ-glucideoxypropyltrimethoxy silane, γ-methacryloxypropyltrimethoxy silane, N-β(aminoethyl)-γ-aminopropyltrimethoxy silane and γ-aminopropyltriethoxy silane.

11. A steel sheet as claimed in claim 1 wherein
the iron content is from 5 to 20% by weight;
said iron-zinc alloy film is in an amount of at least 10 g/m$^2$;
said composite silicate resin is in an amount of from 0.2 to 3 g/m$^2$;
said composite silicate resin film is formed by application of a composite silicate resin treatment solution consisting essentially of the following solid content composition

| | | |
|---|---|---|
| (a) | acrylic copolymer/epoxy resin in a water ratio of from 90/10 to 50/50 | 40 to 80% by weight of the total solid content of components (a) and (b) |
| (b) | silica sol | 20 to 60% by weight of the total solid content of components (a) and (b) |
| (c) | trialkoxysilane compound | 0.5 to 13% by weight of the total solid content of compounds (a) and (b); and | said epoxy resin is selected from the group consisting of a fatty acid-modified epoxy resin, a polybasic acid-modified epoxy resin, an acrylic resin-modified epoxy resin, an alkyd resin-modified epoxy resin, a phenol resin-modified epoxy resin, a polybutadiene resin-modified epoxy resin, and an amine-modified epoxy resin;

said acrylic copolymer is selected from the group consisting of a water soluble or water dispersible copolymer prepared by solution polymerization, emulsion polymerization or suspension polymerization with use of an unsaturated ethylenic monomer, an alkyd-modified acrylic resin, an epoxy-modified acrylic resin, a polybutadiene-modified acrylic resin, a polyurethane-modified acrylic resin, a phenyl-modified acrylic resin, and an amino resin-modified acrylic resin; and said trialkoxysilane compound is selected from the group consisting of vinyltriethoxy silane, vinyltris (β-methoxyethoxy) silane, γ-glucideoxypropyltrimethoxy silane, γ-methacryloxypropyltrimethoxy silane, N-β(aminoethyl)-γ-aminopropyltrimethoxy silane and γ-aminopropyltriethoxy silane.

12. A steel sheet as claimed in claim 11 wherein said acrylc copolymer is polybutadiene modified acrylic resin; said epoxy resin is fatty acid modified epoxy resin; and said trialkoxysilane is γ-methacryloxypropyltrimethoxy silane.

* * * * *